United States Patent [19]

Chang

[11] Patent Number: 5,570,207
[45] Date of Patent: Oct. 29, 1996

[54] HOLOGRAPHIC IMAGE IDENTIFICATION SYSTEM

[76] Inventor: Mao-chi Chang, No. 36, Kang-An Rd., North East Village, Tung-Shih Hsiang, Yun-Lin Hsien, Taiwan

[21] Appl. No.: 268,145

[22] Filed: Jun. 28, 1994

[51] Int. Cl.[6] .............. G03H 1/00; G03H 1/02; G06K 7/10
[52] U.S. Cl. .................. 359/2; 359/28; 235/457
[58] Field of Search .................. 359/1, 2, 10, 15, 359/27, 28; 235/457

[56] References Cited

U.S. PATENT DOCUMENTS

| | | | |
|---|---|---|---|
| 3,643,216 | 2/1972 | Greenaway et al. | 235/457 |
| 5,262,879 | 11/1993 | Davis | 359/10 |
| 5,291,321 | 3/1994 | Noh | 359/30 |
| 5,306,899 | 4/1994 | Marom et al. | 235/382 |
| 5,379,131 | 1/1995 | Yamazaki | 359/2 |

*Primary Examiner*—Paul M. Dzierzynski
*Assistant Examiner*—Audrey Chang
*Attorney, Agent, or Firm*—W. Wayne Lianh

[57] ABSTRACT

A holographic image identification system includes an image reconstruction device having a laser beam source movable along an arc path to selectively project a laser beam onto a hologram located on the center of the arc path at a preselected incidental angle so as to form an image on a screen to be received by a charge coupling device which converts the image into an electrical signal and transmits the electrical signal to a computer to compare with a reference image stored in the storage memory of the computer. The incidental angle of the laser beam is also fed to the computer to compare with a pre-stored value associated with the reference image for double-check of the correctness of the holographic image.

15 Claims, 12 Drawing Sheets

HOLOGRAPHIC IMAGE IDENTIFICATION SYSTEM

FIELD OF THE INVENTION

The invention relates generally to holography, and in particular to a system for identifying an image that is formed with a hologram.

BACKGROUND OF THE INVENTION

Holography is one of the ways to record a three-dimensional image of an object. The original principle of holography was created by Dennis Gabor in 1948 and the first hologram developed by Dennis Gabor is the so-called in-line hologram. However, due to lacking high strength coherent light at that moment when the holography was first developed, the holography was not popular. It was not until laser beam, which is basically an intensive coherent light, was developed in 1960s that the holography has been significantly improved and commercialized.

Generally speaking, holography uses two coherent light beams, such as laser beams, of which one, called reference beam, is directly projected to a photographic film and the other, called object beam, is first projected to an object to be recorded and then reflected to the photographic film by the object. The two beams form an interference pattern on the photographic film and thus record thereon the spatial geometric characteristics of the object and the photographic film with an interference pattern formed thereon called hologram. Sometimes, it may require two or more object beams to photograph a large object which occupies a great space. The interference pattern on the photographic film forms a diffraction grating recording the information of optical wavefront of the object beam reflected from the object.

The holography requires the reference beam and the object beam to be identical coherent light and thus preferably, the two beams are obtained from the same source and split into two beams by a beam splitter.

In forming the hologram, the reference beam and the object beam may both be projected onto the photographic film at the same side thereof and a hologram formed in this way is called a transmission hologram. Alternatively, the reference beam and the object beam may be projected onto the photographic film along substantially opposite directions, namely they are respectively projected onto the two opposite surfaces of the photographic film, and this is the so-called reflection hologram.

To reconstruct the three-dimensional image of the object, a display beam, which is exactly identical to the reference beam, is projected to the hologram along the same path of the reference beam. The display beam passes through the diffraction grating constituted by the interference pattern of the reference beam and the object beam and diffract so as to form a three-dimensional image of the object.

The holography has been widely used in a variety of fields and new applications are still in development. One of the most useful applications of the holography is in the nondestructive inspection field. Certainly, the holography is an excellent tool in optics, for example in the inspection of high precision optical instruments, such as the lens.

It is also possible to use the holography to develop new arts, such as three-dimensional movies and other art applications. However, one of the most commonly known applications of the holography is in the personal identification (PID) document, such as a credit card. As a matter of fact, almost all major credit cards have already adapted hologram as an identification mark. Nevertheless, the very essence of the holography has not been fully exploited, especially in the field of PID. For example, one of the features of the holography is that only is a display beam which is exactly the same as the reference beam used to form a hologram projected onto the hologram along the same path, namely at the same incidental angle relative to the hologram, then a three-dimensional image may be formed at the same distance away from the hologram as the object of which the image is recorded on the hologram is relative to the hologram. By checking the incidental angle and the relative position of the image with respect to the hologram, it is more capable to find out a counterfeit PID that bears a counterfeit hologram figure thereon, for it is difficult to perfectly re-produce a hologram without knowing what kind of coherent light is used to form the hologram and at what angle the reference beam is projected onto the hologram film.

Another potential usage of the holography is the "grating bar code" which comprises a number of sets of parallel and equally-spaced grating extending along different directions which, upon incident of a laser beam, form a number of sets of light spots having different spacing distance determined by the spacing distances of the grating. The spacing distances of the grating encode symbols and the spacing distances of the light spots decode the symbols.

SUMMARY OF THE INVENTION

It is therefore a primary object of the present invention to provide a holographic image identification system which is capable to inspect a holographic image formed with a hologram in a more trustworthy manner by including the checking of the incidental angle of display beam, the location of the image and the shape and size of the image.

Another object of the present invention is to provide a PID which can be correctly identified by the holographic image identification system and which has a grating bar code formed thereon for further identification.

To achieve the above-mentioned objects, there is provided a holographic image identification system comprising an image reconstruction device having a laser beam source movable along an arc path to selectively project a laser beam onto a hologram located on the center of the arc path at a preselected incidental angle so as to form an image on a screen to be received by a charge coupling device which converts the image into an electrical signal and transmits the electrical signal to a computer to compare with a reference image stored in the storage memory of the computer. The incidental angle of the laser beam is also fed to the computer to compare with a pre-stored value associated with the reference image for double-checking of the correctness of the holographic image.

BRIEF DESCRIPTION OF THE DRAWINGS

Other objects and advantages of the invention will be apparent from the following description of the preferred embodiments of the present invention taken in connection with the accompanying drawings, wherein.

DETAILED DESCRIPTION OF THE PREFERRED EMBODIMENTS

Figure 1:
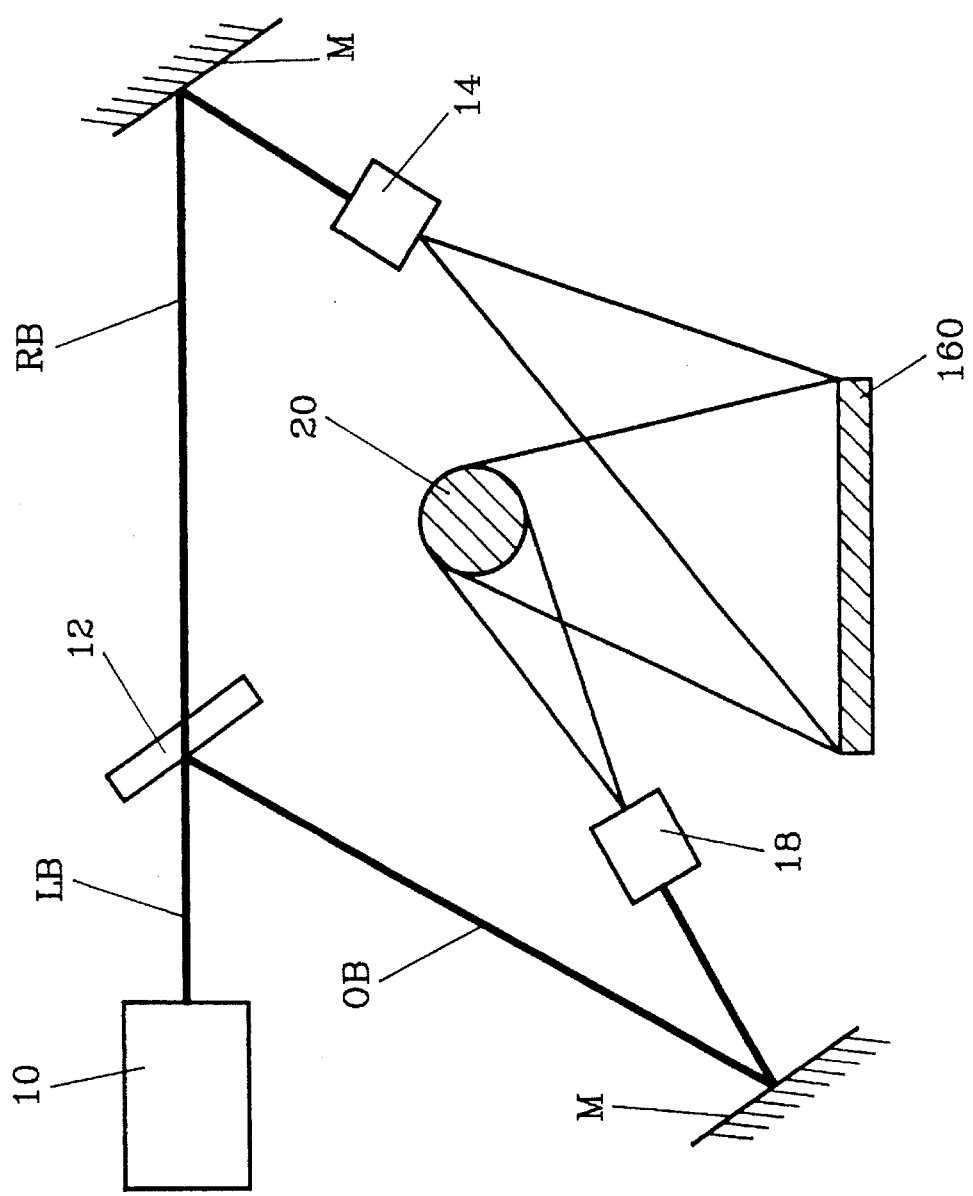
FIG. 1 is a schematic view showing a conventional holographic arrangement for forming a transmission hologram.

A brief discussion of the holography will be given first, with reference to FIGS. 1 to 4, as background information for describing a holographic image identification system constructed in accordance with preferable embodiments of the present invention. In FIG. 1, a holographic system for taking a transmission hologram is shown, which will be referred to as a transmission holographic system hereinafter. The transmission holographic system, in general, is comprised of a coherent light beam source, such as a laser beam source 10, which emits a laser beam LB. The laser beam LB emitted from the laser beam source 10 is split into a reference beam RB and an object beam OB by a beam splitter 12. The reference beam RB is directed through a spatial filter 14 toward a particular side of a photographic film 160 by which a hologram is formed. On the other hand, the object beam OB is first directed, through a spatial filter 18, toward an object 20 of which a three-dimensional image is to be recorded on the transmission hologram. The object beam OB is then reflected by the object 20 in a random manner depending upon the shape of the object 20 toward the same particular side of the photographic film 160. The reference beam RB and the object beam OB together form an interference pattern on the photographic film 160 which interference pattern is a representation of the spatial geometric configuration of the object 20. In this way, a three-dimensional image of the object 20 is recorded on the photographic film 160. A hologram formed in this way is usually referred to as a transmission hologram.

Figure 2:
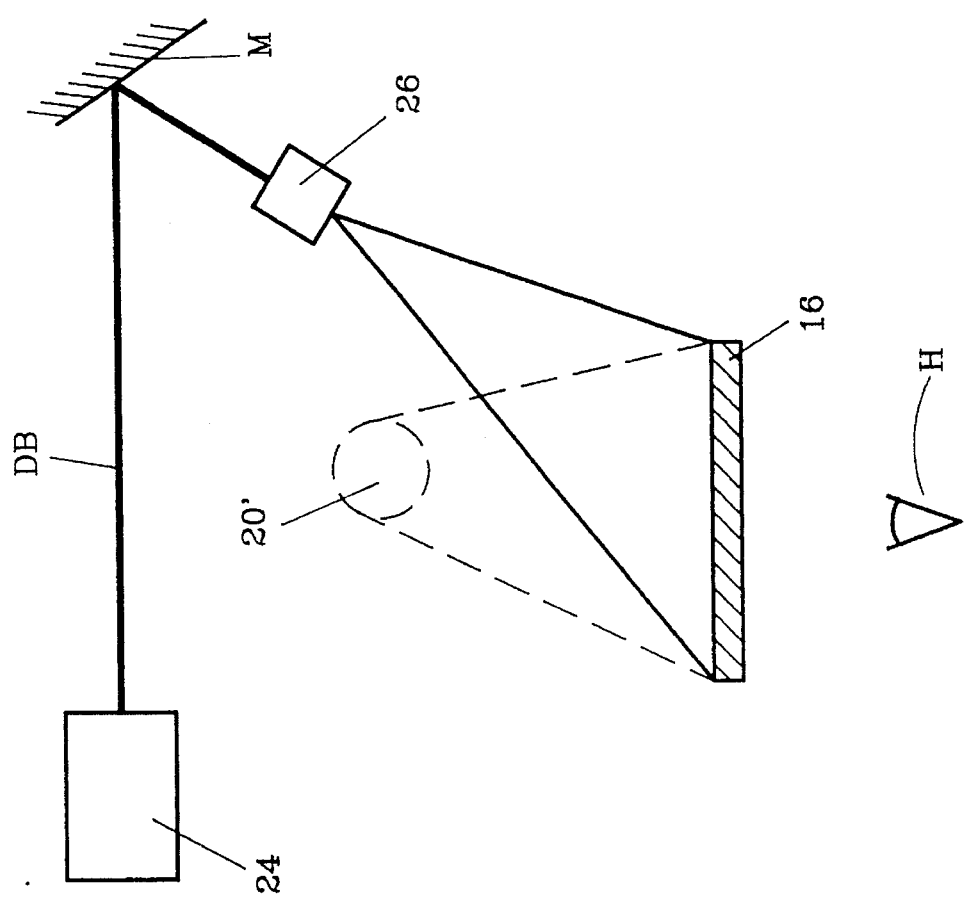
FIG. 2 is a schematic view showing a conventional way for reconstructing or displaying the three-dimensional image of an object recorded in the transmission hologram, in which a virtual image is formed.

In FIG. 2, the reconstruction or display of the three-dimensional image of the object 20 that is recorded on a transmission hologram, which is formed on the photographic film 160 with the system shown in FIG. 1 and is now designated by the reference numeral 16, is demonstrated. To reconstruct or display the three-dimensional image of the object 20, a coherent light beams which is exactly identical to the reference beam and will be referred to as display beam, DB, is projected from a coherent light beam source 24, which in this specific example is a laser beam source similar to laser beam source 10 shown in FIG. 1, toward the particular side of the transmission hologram 16 to which the reference beam RB is projected at exactly the same incidental angle, namely, along the same path. A spatial filter 26 is disposed along the path of the display beam DB, functioning as the spatial filter 14 of FIG. 1. The display beam DB that is projected onto the transmission hologram 16 diffracts at the interference pattern formed on the transmission hologram 16 and when a person H views from the other side of the transmission hologram 16, namely the side of the transmission hologram 16 that is opposite to the particular side to which the display beam DB is projected, a virtual three-dimensional image 20' of the object 20 is displayed or reconstructed.

Figure 3:
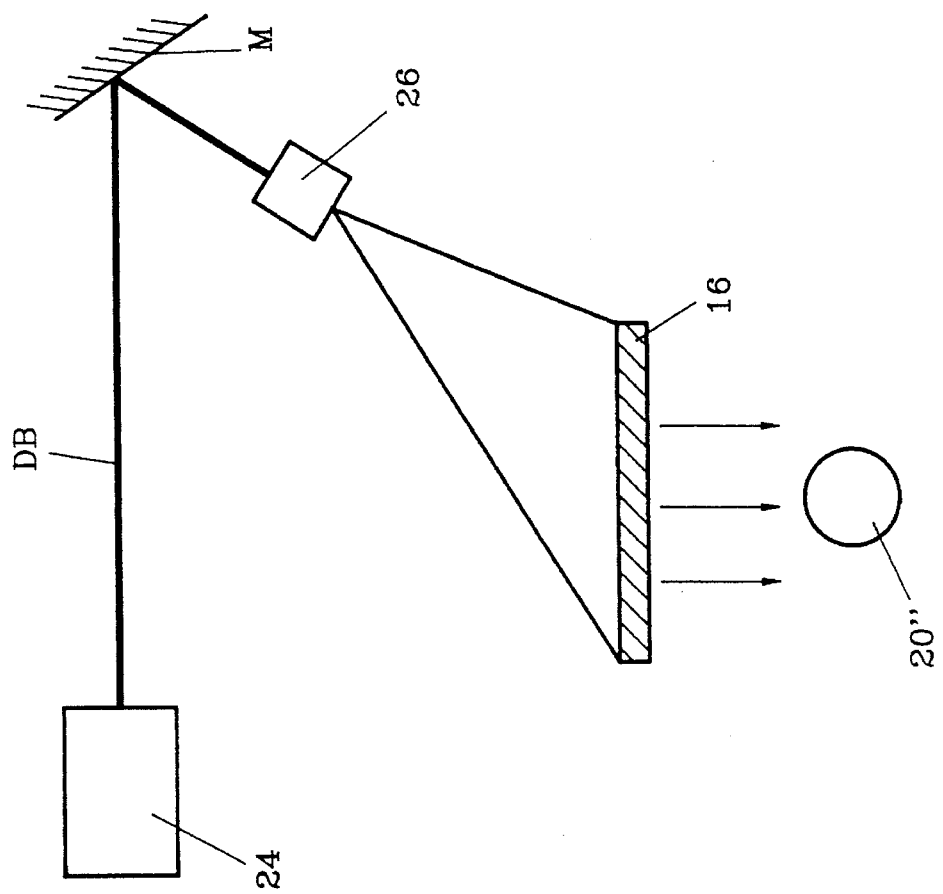
FIG. 3 is a schematic view showing another conventional way for reconstructing or displaying the three-dimensional image of an object recorded in the transmission hologram, in which a conjugate real image is formed.

If the display beam DB is projected to the transmission hologram 16 along a path that is exactly opposite to the path of the reference beam RB of FIG. 1, namely the display beam DB is projected to the side of the transmission hologram 16 opposite to the side to which the reference beam RB is projected, then a conjugate real three-dimensional image 20" is formed on the side of the transmission hologram 16 opposite to the side to which the display beam DB is projected. This is shown in FIG. 3.

The reconstruction or display of the three-dimensional image 20' or 20" of the object 20 requires the display beam DB to transmit through the transmission hologram 16, and this is the reason that hologram of this type is called "transmission hologram".

Figure 4:
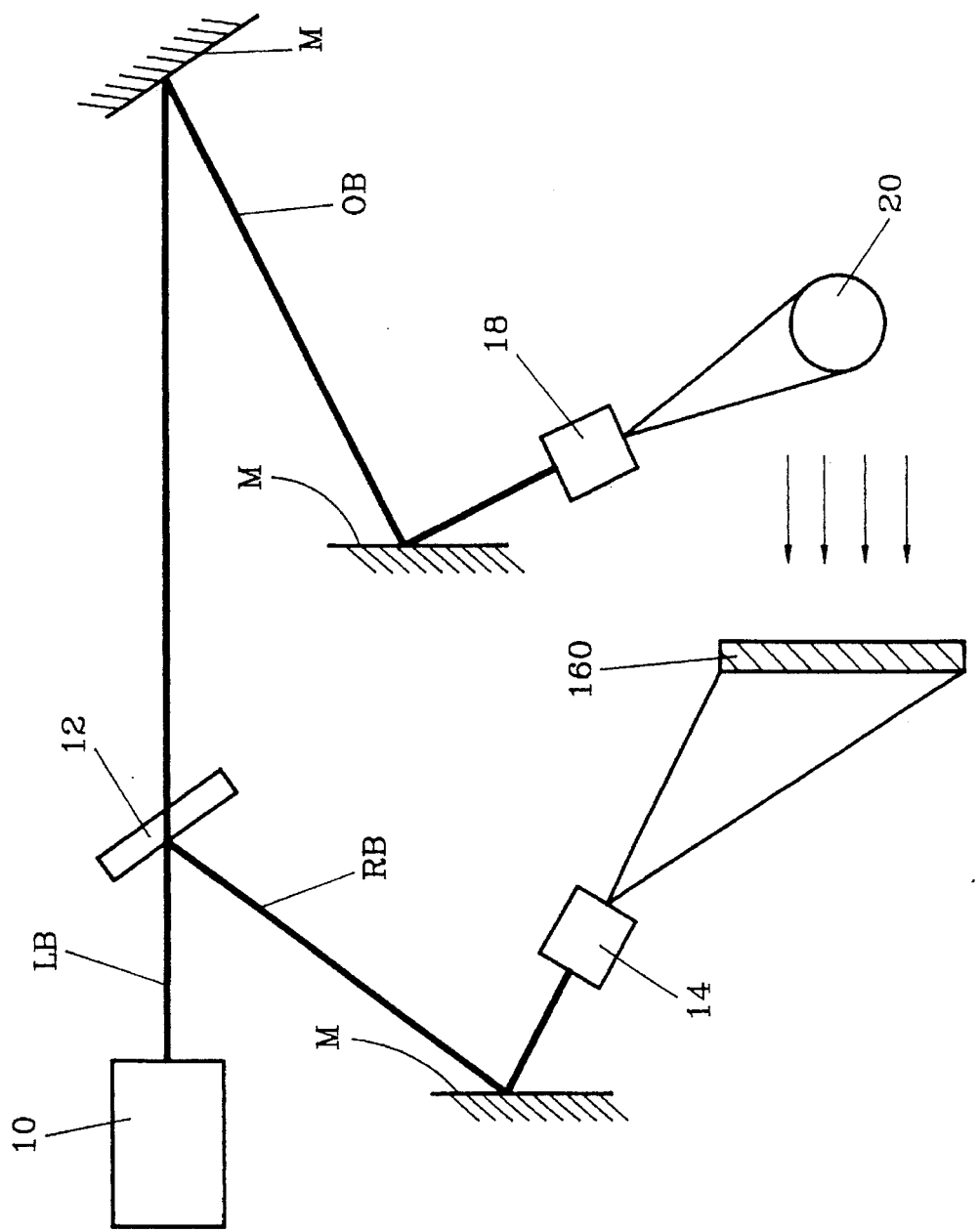
FIG. 4 is a schematic view showing a conventional holographic arrangement for forming a reflection hologram.

The formation of the reflection hologram is shown in FIG. 4. As that shown with reference to the transmission holographic system of FIG. 1, the holographic system for forming a reflection hologram, which will be referred to as a reflection holographic system, comprises a coherent light beam source, such as a laser beam source 10 which emits a laser beam LB. The laser beam LB is split by a beam splitter 12 into a reference beam RB which is directed through a spatial filter 14 toward a first side of a photographic film 160 and an object beam OB which is directed through a spatial filter 18 toward an object 20 of which a three-dimensional image is to be recorded on the reflection hologram, and then reflected by the object 20 toward the photographic film 160 at an opposite second side thereof. The reference beam RB and the object beam OB which are projected toward the photographic film 160 at opposite sides together form an interference pattern on the photographic film 160. The interference pattern is a representation of a three-dimensional image of the object 20. A hologram formed in this way is called a "reflection hologram".

Alternatively, a more simplified and much earlier developed reflection holographic system uses a laser beam projected toward a photographic film with the object displaced at the opposite side of the photographic film relative to the laser beam source. The laser beam which is projected to and transmits through the photographic film is reflected by the object toward the opposite side of the photographic film to form an interference pattern thereon with the laser beam that just reaches the film from the laser beam source. Since only one laser beam is required in this simplified manner, it is usually referred to as single beam reflection hologram and in comparison, the reflection hologram discussed with reference to FIG. 4 is referred to as split beam reflection hologram.

The reconstruction or display of a three-dimensional image from a reflection hologram requires a display beam to project onto the reflection hologram along exactly the same path of the reference beam. Upon doing so, a portion of the display beam will be reflected by the reflection hologram film, dependent upon the interference pattern on the hologram, and the reflected light will be the same as the object beam that is used to form the reflection hologram and thus displays a three-dimensional image of the object. This is the reason that this type of hologram is referred to as "reflection hologram".

Please note in FIGS. 1–4, the reference symbol M denotes "mirror" which directs the laser beam, either the reference beam or the object beam, along a desired path.

Figure 5:
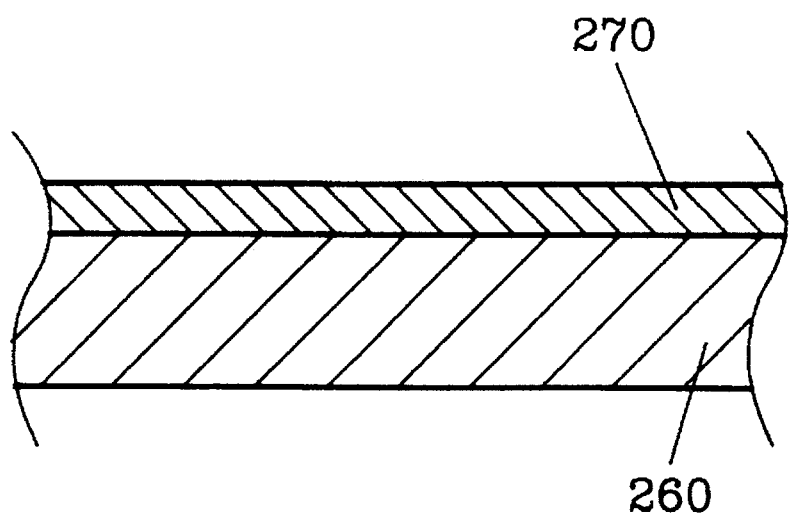
FIG. 5 is a schematic side elevational view of a portion of a modified transmission hologram on which a metallic reflection layer is coated.

Although a particular three-dimensional image always shows on a particular side of the hologram for a particular hologram, it is possible to switch the three-dimensional image to the opposite side of the hologram by coating a reflective layer, such as a thin metal layer, on the hologram, as shown in FIG. 5, wherein a thin metal layer 270 for the provision of a reflection surface is coated on the hologram, which is designated with the reference numeral 260 in FIG. 5 and which may be for example a transmission hologram designated with the reference numeral 16 in FIGS. 2 and 3. By doing so, the reflective layer 270 functions as a mirror which reflects the image to the opposite side of the hologram 260 and this may serve to reduce the required space for the display or reconstruction of the three-dimensional image. For example, for a transmission hologram, if the display beam follows exactly the same path as the reference beam, then the reconstructed image, which is a virtual image, always shows on the side of the hologram opposite to the side to which the reference beam is projected. By adding a metal coating as shown in FIG. 5, the virtual image will be reflected and thus shows on the same side of the transmission hologram to which the reference beam or the display beam is projected to. The space that is located on the side on which the virtual image is originally shown is no longer needed for the display of the image, for the image is now reflected by the metal coating and thus shown on the other side of the hologram. For easy reference, such a metal-coated transmission hologram is referred to as "modified transmission hologram" herein.

Having briefly discussed the principle of the holography that is adapted in the present invention, a holographic image identification system constructed in accordance with the present invention will now be discussed with reference to preferred embodiments thereof illustrated in FIGS. 6, 7 and 8.

Figure 6:
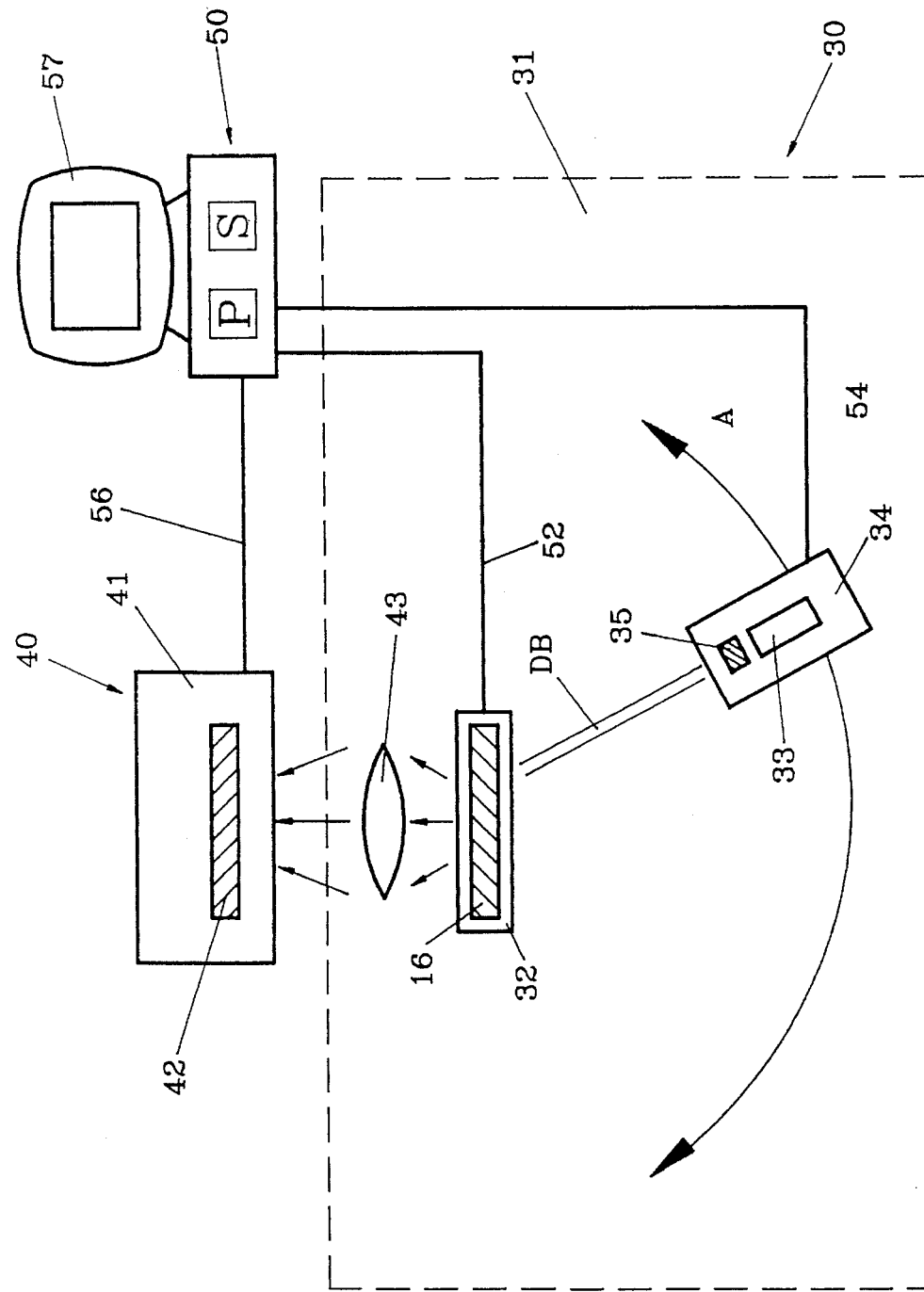
FIG. 6 is a schematic view showing a holographic image identification system for identifying a transmission hologram in accordance with a first embodiment of the invention.

With reference to FIG. 6, wherein a first embodiment of the holographic image identification system of the present invention is shown for use with the transmission hologram, the holographic image identification system for transmission hologram comprises of an image reconstruction device 30 which reconstructs and displays a three-dimensional image on an image reading device 40 from a hologram, a transmission hologram 16 in this case. The image reading device 40 transmits the image displayed thereon to a control device, preferably a computer 50 having a processing unit P for processing the image transmitted from the image reading device 40 and a storage memory S for storing therein a reference image to be compared with the image read by the image reading device 40.

The image reconstruction device 30 comprises a base 31 on which a hologram holder 32 for holding thereon the hologram 16 to be identified. The hologram holder 32 is movable by driving means (not shown), such as a step motor, which is in electrical connection with the computer 50 via cable 52 to be controlled thereby to actuate the hologram holder 32 to position the hologram 16 at an identification position on the base 31.

The image reconstruction device 30 further comprises at least one coherent light beam source, such as a laser beam source 33, to project a coherent light beam (a laser beam), which is the display beam DB for the display or reconstruction of the three-dimensional image recorded on the hologram 16 so as to form a three-dimensional image thereof on the image reading device 40. The laser beam source 33 can be any suitable device, such as a laser diode. The laser beam source 33 is mounted on a support 34 which is movable along an arc path about the identification position on which the hologram 16 is located, as indicated by arrow A of FIG. 6 under the control of the computer 50 via cable 54. This arrangement allows the computer 50 to follow a pre-programmed sequence to project laser beam from the laser beam source 33 toward the hologram 16 at any desired angular position along the arc path.

Alternatively, manual operation of the laser beam source 33 to project laser beam at any desired angle may also be possible by directly manipulating the laser beam source 33 and the support 34 or through the computer 50 by keying in control command with key-in means (not shown) of the computer 50.

Figure 7:
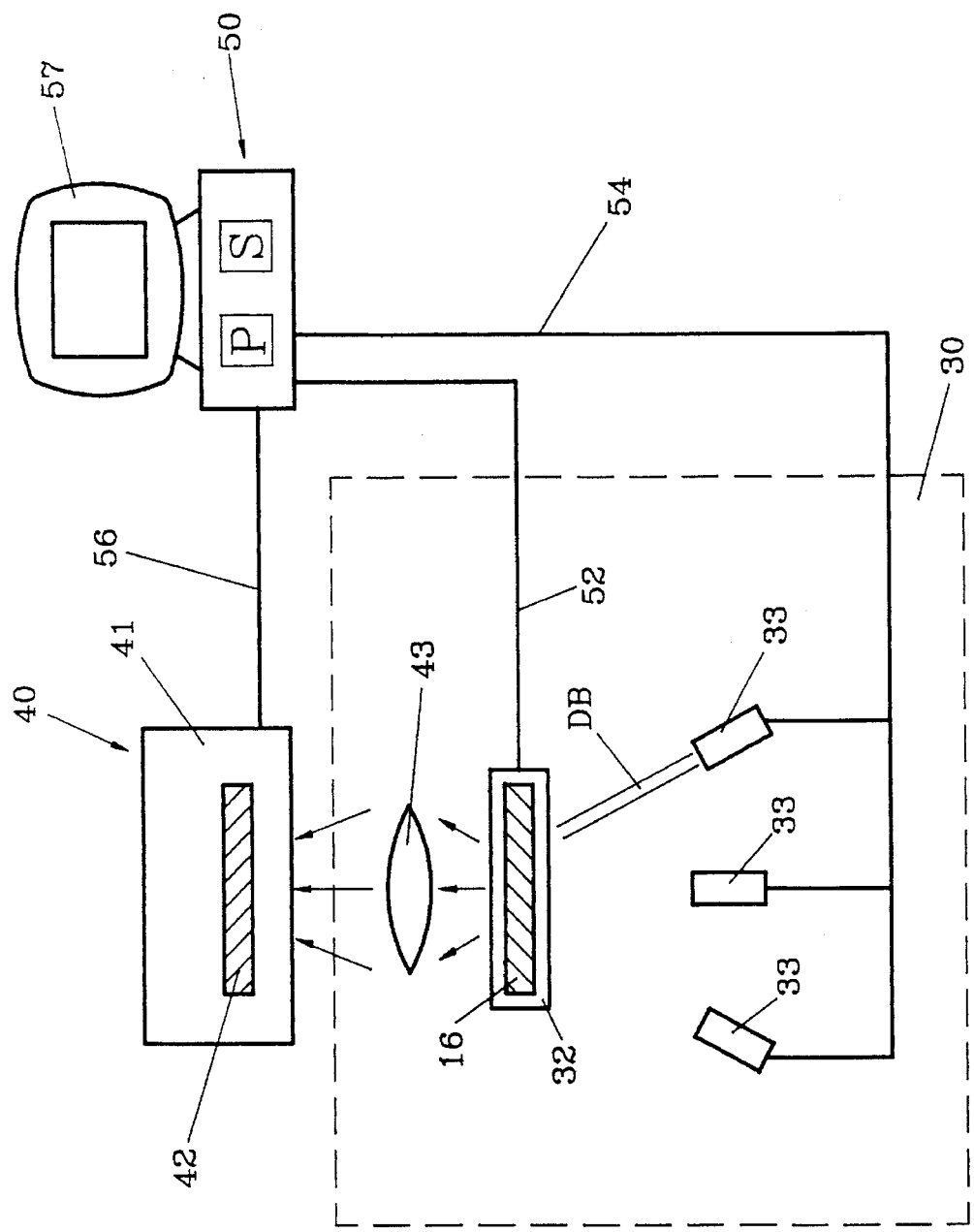
FIG. 7 is a schematic view showing a second embodiment of the holographic image identification system of the present invention for identifying a transmission hologram.

Another way to project the display beam DB at any desired angle is to dispose a plurality of fixed laser beam sources 33 on the base 31 along the arc path, preferably in an specifically-spaced manner, as shown in FIG. 7, and all the laser beam sources 33 are in connection with the computer 50 via the cable 54 to be controlled thereby.

The image reading device 40 generally comprises a charge coupling device (CCD) 41 which has a screen 42 mounted thereto. The laser beam DB that is emitted from the laser beam source 33 and projected onto the hologram 16 forms a three-dimensional image thereof on the screen 42 and the CCD 41 receives and converts the optical signal of the image on the screen 42 into electrical signal which is then transmitted to the computer 50 via cable 56.

The image reading device 40 may further comprises a focusing element, such as a lens 43, disposed between the screen 42 and the hologram 16 for the provision of a more clear image on the screen 42.

The computer 50 may comprises of a monitor 57 for monitoring the operation of the holographic image identification system of the present invention.

As can be seen in FIGS. 6 and 7, the screen 42 on which the three-dimensional image of the transmission hologram 16 is shown and the laser beam source(s) 33 are located at opposite sides of the transmission hologram 16. This is because, as discussed previously, the transmission hologram 16 forms a virtual image on the side opposite to the side to which the display beam DB is projected.

Figure 8:
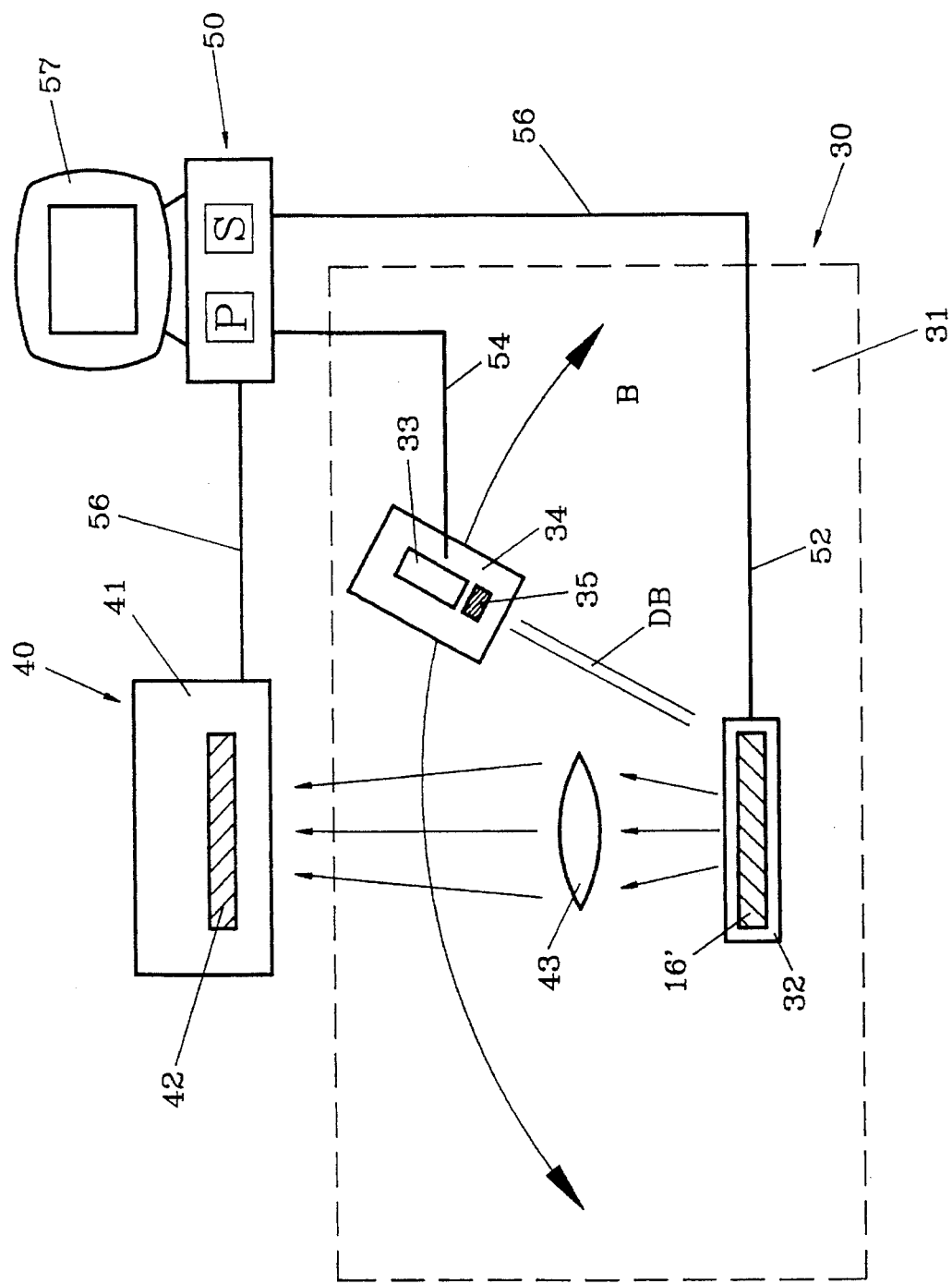
FIG. 8 is a schematic view showing a third embodiment of the holographic image identification system of the present invention for identifying a reflection hologram or a modified transmission hologram illustrated in FIG. 5.

An embodiment for identifying a reflection hologram or a modified transmission hologram in accordance with the present invention is shown in FIG. 8 wherein the reflection hologram (or the modified transmission hologram) is designated with the reference numeral 16'. The system for identifying a reflection hologram or a modified transmission hologram, which will be referred to as a reflection hologram identification system, is substantially the same as the transmission hologram identification system illustrated in FIGS. 6 and 7, except the laser beam source 33 and the screen 42 of the image reading device 40 are located at the same side of the reflection hologram (or the modified transmission hologram) 16'. In other words, the reflection hologram identification system in accordance with the embodiment shown in FIG. 8 comprises an image reconstruction device 30 having a base 31 on which a hologram holder 32 is movably disposed and controlled by a computer 50 via cable 52 to move the reflection hologram (or the modified transmission hologram) 16' to an identification position. At least a laser beam source 33 is provided by being mounted on a support 34 which is movable along an arc path on the base 31, indicated by arrow B in FIG. 8, about the identification position under the control of the computer 50 via cable 54. The laser beam source 33 emits a display beam DB toward the reflection hologram (or the modified transmission hologram) 16' located on the identification position to form a three-dimensional image on the screen 42 and the image is then read and converted into electrical signal by a CCD 41 of the image reading device 40. The electrical signal of the image is transmitted through cable 56 to the computer 50. If desired, a focusing lens 43 may be provided between the reflection hologram (or the modified transmission hologram) 16' and the screen 42.

It is also possible to use a plurality of fixed laser beam sources 33 disposed in a specifically-spaced manner along the arc path B on the base 31 to replace the single movable laser beam source.

In the embodiments illustrated in FIGS. 6, 7 and 8, there may be provided with beam intensity sensing means, such as a photo-resistor 35 which takes a minor portion of the display beam DB emitted from the laser beam source 33 for inspection of the variation of the intensity of the display beam DB. The variation of the display beam DB is transmitted to the computer 50 for the calibration of the reading of the three-dimensional image on the screen 42 by the CCD 41 so that the intensity variation of the display beam DB does not affect the image reading by the image reading device 40.

Figure 9A:
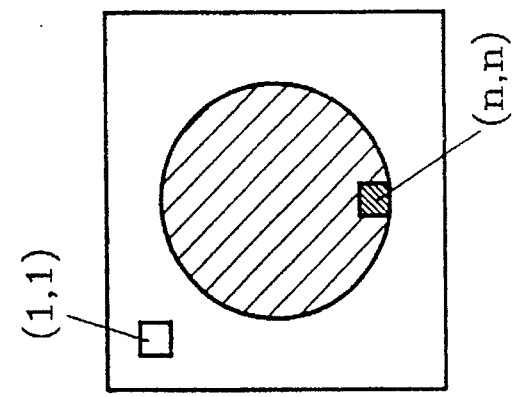
FIG. 9 shows the comparison of the image to be identified with the reference image which is stored in a storage memory of the system, in accordance with the present invention, wherein (A) is the reference image, (B) the image to be identified and (C) another image to be identified.
Figure 9B:
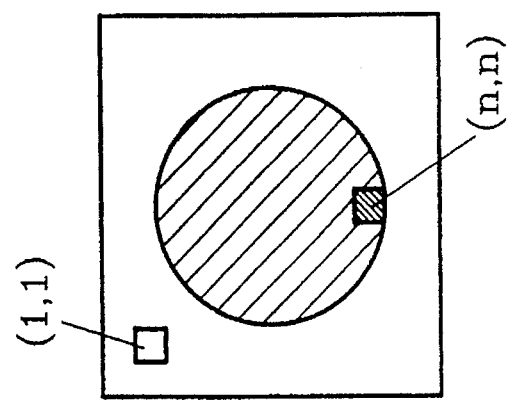
Figure 9C:
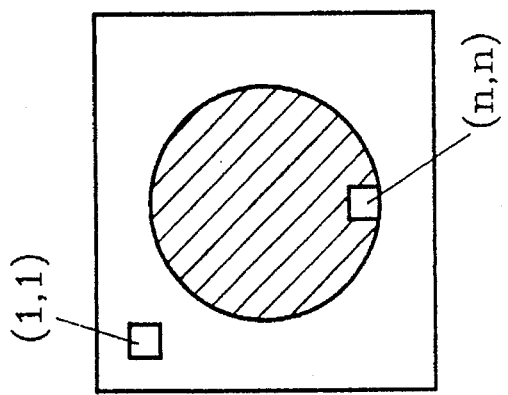

As mentioned previously, the computer 50 comprises a processing unit P which is capable to process the electrical signal of the image reconstructed from the hologram 16 or 16' One of the more commonly known manners to represent an image by electrical signal is to divide the image or the screen on which the image is formed, such as the screen 42 in FIGS. 6–8, into a matrix of pixels each having a particular gray level value, usually ranging from 0 (the darkest) to 255 (the brightest), to represent the image darkness for a black-and-white multi-level image, such as those shown in FIGS. 9A, 9B and 9C wherein only a couple of pixels, together with the coordinates thereof are marked. In the embodiments illustrated herein, the coordinates and the gray level values of all the pixels of the image are transmitted as electrical signal to the computer 50. The gray level values of all the pixels of the image to be identified are compared in the processing unit P of the computer 50 with those of a reference image pre-stored in the story memory S of the computer 50.

FIG. 9A illustrates a reference image pre-stored in the computer storage memory S. FIG. 9B represents an image to be identified which is formed on the screen 42 of the image reading device 40 of the holographic image identification system of the present invention. FIG. 9C is another image to be identified.

The comparison of the gray level value is done through all the pixels of the image. To evaluate the deviation of the image to be identified, such as images shown in FIGS. 9B and 9C (which will be also referred to as images B and C, respectively), from the pre-stored reference image, image of FIG. 9A (which will be also referred to as image A), a difference value is maintained and incremented by one once the comparison of one of the pixels between reference image A and, for example, image B shows that their gray level values are different. The final value of the difference between the reference image and the image to be identified is then compared with a threshold value stored in the computer storage memory S in advance. If the final difference value is less than or equal to the threshold value, then the image to be identified is considered the same as the reference image.

Taking the reference image A and the images to be identified B and C as an example, two pixels with coordinates (1,1) and (n,n) are particularly marked in image A, wherein pixel (1,1) has a gray level value x and pixel (n,n) has a gray level value y. The image B has also the two corresponding pixels (1,1) and (n,n) particularly marked and both pixels (1,1) and (n,n) have the same gray level values as their counterpart pixels in image A so that in comparison of these two pixels between the reference image A and the image B, no change is made to the difference value. The image C has also the two pixels (1,1) and (n,n) particularly marked and the pixel (1,1) has the same value as that of image A but pixel (n,n) has a gray level value y' that is different from the image A so that in comparison of pixel (1,1) between images A and C, no increment of the difference value is made, but in comparison of pixel (n,n), the difference value is incremented by one.

To prevent the variation of the intensity of the display beam DB emitted from the laser beam source 33 in displaying the image on the screen 42 affects the gray level values of all the pixels that constitute the image, as mentioned previously, a photo-resistor 35 is provided for the calibration and compensation of the intensity variation of the laser beam.

In accordance with the present invention, once an image to be identified is successfully matched by the reference image stored in the computer storage memory S, then the laser beam incidental angle is recorded by the computer 50 which incidental angle is readily obtained from the angular position of the laser beam source 33 relative to the hologram 16 or 16'. The laser beam incidental angle is then compared with a value of incidental angle that is associated with the construction of the reference image stored in the computer storage memory S. The comparison of an image to be identified and the reference image is considered successful only when both the image and the incidental angle are correctly matched.

Thus, in accordance with the present invention, a holographic image can be identified in three respects:

(1) the incidental angle of the reconstruction beam;

(2) the image itself; and (3) the location where the image is formed.

The comparison of the location where the image is formed is done in an implicit manner. The screen 42 which is located at a fixed distance from the hologram 16 or 16' that is held on the fixed identification position so that once the image is formed in a wrong location, then the gray level reading on the screen 42 will be different, even through the image at the wrong location may be matched by the reference image.

Besides the double-check of the holographic image provided by the present invention that has just been described, in accordance with the present invention, there is also provided a grating bar code on a personal identification (PID). Examples of the grating bar code are shown in FIGS. 10A, 11A and 12A and a discussion will be given hereinafter.

Figure 10B:
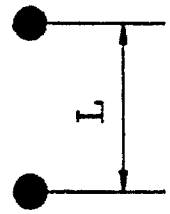
FIG. 10 shows a first embodiment of grating bar code in accordance with the present invention, wherein (A) is an enlarged view of the grating bar code and (B) shows the diffraction light spots resulted from the diffraction of a coherent light beam projected onto the grating of (A)
Figure 10A:
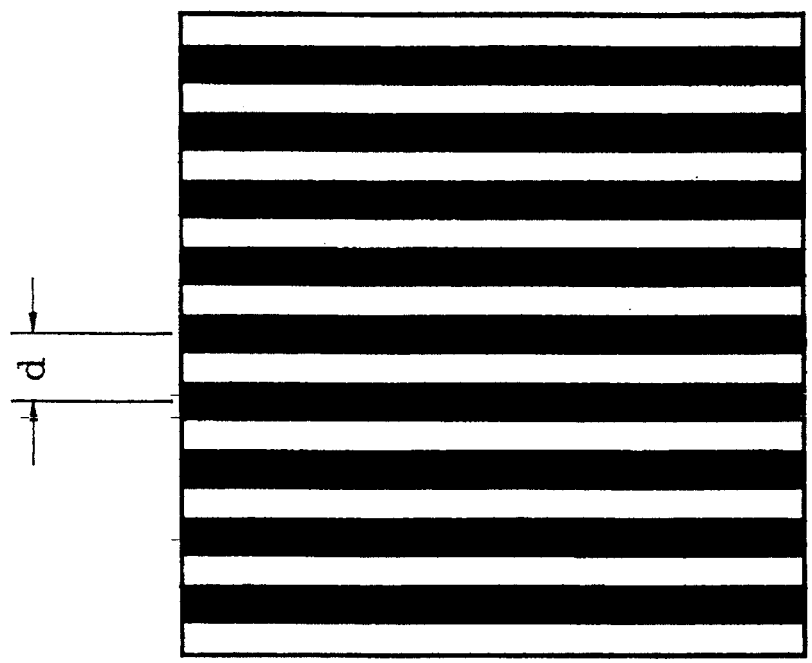

In accordance with the principle of the holography, when a coherent light beam is projected onto a hologram which has an interference pattern constituted by a plurality of parallel and equally-spaced diffraction grating, as shown in FIG. 10A, in which the distance between two adjacent slits is d, a series of aligned, bright light spots are formed, as shown in FIG. 10B, and the distance between two adjacent light spots, indicated by L in FIG. 10B, is determined by slit distance d and the distance between the screen on which the light spots are formed and the hologram or the diffraction grating.

If the distance between the screen and the diffraction slits are fixed, then the distance between the light spots is determined solely by the distance between the grating slits so that different slit distance may be used to represent different symbol or code which can be "decoded" by measuring the distance between the light spots.

Figure 11B:
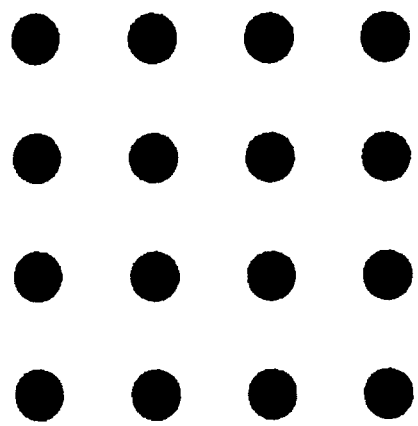
FIG. 11 shows a second embodiment of grating bar code in accordance with the present invention, wherein (A) is an enlarged view of the grating bar code and (B) shows the diffraction light spots resulted from the diffraction of a coherent light beam projected onto the grating of (A)
Figure 11A:
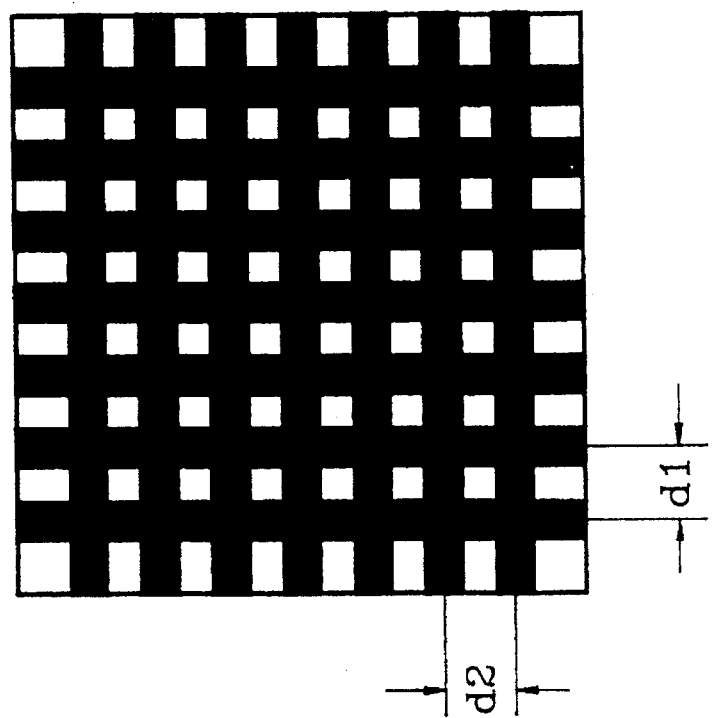

FIGS. 11A and 11B show another example of the grating bar code, in which two sets of parallel and equally-spaced diffraction grating are formed on a hologram in a mutually perpendicular manner (FIG. 11A) and correspondingly, a matrix of bright light spots (FIG. 11B) may be formed by projecting a coherent light beam onto the hologram. Similarly, the distance between the light spots can be used to decode the code represented by the distance between the diffraction slits. Furthermore, in this specific case, there may be two codes carried by the hologram, for the slit distance in a first direction, for example the vertical direction, may be different from that of a second direction, for example the horizontal direction.

Figure 12B:
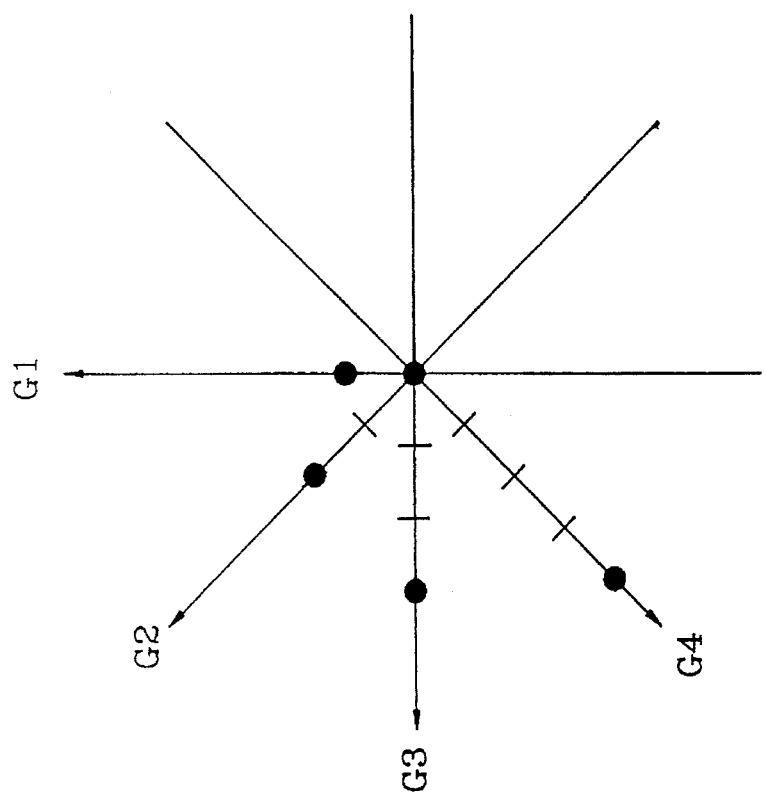
FIG. 12 shows a third embodiment of grating bar code in accordance with the present invention, wherein (A) is an enlarged view of the grating bar code and (B) shows the diffraction light spots resulting from the diffraction of a coherent light beam projected onto the grating of (A).
Figure 12A:
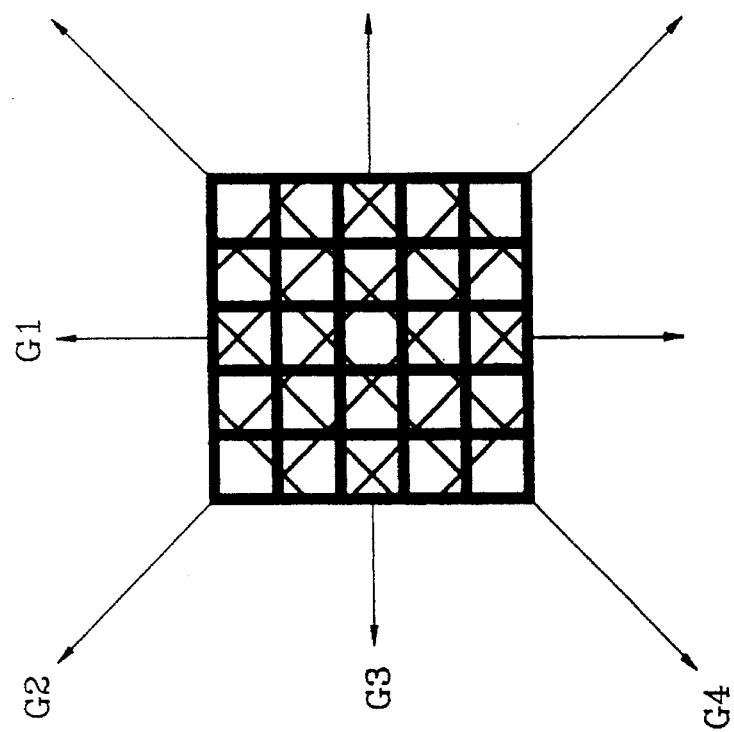

In FIGS. 12A and 12B, a further example of the grating bar code is given. In FIG. 12A, a number of sets of parallel, equally-spaced diffraction slits G1, G2, G3 and G4 are formed on a hologram, each extending along a different orientation and not parallel with each other. Each set of the diffraction slits G1, G2, G3 and G4 form a series of bright light spots (FIG. 12B) lined up along a particular direction associated therewith so that there may be more codes carried by the hologram and similarly, these codes can be decoded by measuring the distance between the light spots.

Such a grating bar code may be adapted simultaneously with the holographic image identification mark on a PID so that by first reading the information encoded in the grating bar code, a further processing of the holographic image may be conducted in a more time efficient and more secure manner.

It is apparent that although the invention has been described in connection with the preferred embodiments, those skilled in the art may make changes to certain features of the preferred embodiments without departing from the spirit and scope of the invention as defined in the appended claims.

What is claimed is:

1. A holographic image identification system comprising:

image reconstruction means comprising a base on which a movable hologram holder is disposed to retain thereon a hologram on which an interference pattern representing a three-dimensional image of an object to be identified by said holographic image identification system is formed in advance and to move the hologram to an identification position;

coherent light beam generation means for selectively projecting, at a pre-determined incidental angle, a coherent light beam onto the hologram located on the identification position to display the three-dimensional image;

image reading means comprising a screen on which the three-dimensional image is shown by the image reconstruction means, and a charge coupling device, which is connected to the screen to receive the three-dimensional image displayed on the screen and convert the image into electrical signal representing the image;

computer means having a storage memory in which data of a reference image and a reference angle associated with the reference image are stored in advance, and a processing unit, which receives the electrical signal of the image to be identified from the image reading means, retrieves the reference image data and compares the image to be identified with the reference image, and when the comparison is successful, the processing unit further accesses the storage memory to retrieve the reference angle to compare with the predetermined incidental angle at which the coherent light beam is projected onto the hologram wherein the coherent light beam generation means comprises a support to hold thereon a coherent light source, the support being movable along an arc path on the base with a center of the arc substantially coincidental with the hologram identification position to selectively project the coherent light beam at an angle corresponding to the pre-determined incidental angle of the coherent light beam onto the hologram for displaying the image on the screen.

2. The holographic image identification system as claimed in claim 1, wherein the image reading means further comprises focusing means disposed between the screen and the hologram.

3. The holographic image identification system as claimed in claim 2, wherein the focusing means comprises an optical system.

4. The holographic image identification system as claimed in claim 1, wherein the computer means comprises a monitor for monitoring operation of said holographic image identification system.

5. The holographic image identification system as claimed in claim 1, wherein the image to be identified that is formed on the screen comprises a matrix of pixels each having a gray level value associated therewith and defined by coordinates associated with the pixel matrix and wherein the electrical signal carries the gray level values of all the pixels together with coordinates thereof to the computer means, the reference image also comprising a matrix of pixels having coordinates corresponding to the coordinates of the pixel matrix of the image to be identified, and each of the pixels of the reference image having a gray level value associated therewith, the comparison of the image to be identified with the reference image is done by comparing the gray level values of the corresponding pixels of the image to be identified and the reference image.

6. The holographic image identification system as claimed in claim 5, wherein the comparison between the image to be identified and the reference image provides a difference value which indicates the number of pixels of the image to be identified having a gray level value different from that of the corresponding pixels of the reference image and wherein a threshold reference is provided in the computer means to be compared with the difference value to determine success of comparison.

7. The holographic image identification system as claimed in claim 1, further comprising means for detecting intensity of the coherent light beam for calibration of reading of the image on the screen by the charge coupling device.

8. A personal identification card comprising a hologram formed thereon identifiable by a holographic image identification system, said holographic image identification system comprises:

image reconstruction means comprising a base on which a movable hologram holder is disposed to retain thereon a hologram on which an interference pattern representing a three-dimensional image of an object to be identified by said holographic image identification system is formed in advance and to move the hologram to an identification position;

coherent light beam generation means for selectively projecting, at a pre-determined incidental angle, a coherent light beam onto the hologram located on the identification position to display the three-dimensional image;

image reading means comprising a screen, on which the three-dimensional image is shown by the image reconstruction means, and a charge coupling device, which is connected to the screen to receive the three-dimensional image displayed on the screen and convert the image into electrical signal representing the image;

computer means having a storage memory, in which data of a reference image and a reference angle associated with the reference image are stored in advance, and a processing unit, which receives the electrical signal of the image to be identified from the image reading means, retrieves the reference image data and compares the image to be identified with the reference image, and when the comparison is successful, the processing unit further accesses the storage memory to retrieve the reference angle to compare with the pre-determined incidental angle at which the coherent light beam is projected onto the hologram wherein the coherent light beam generation means comprises a support to hold thereon a coherent light source, the support being movable along an arc path on the base with a center of the arc substantially coincidental with the hologram identification position to selectively project the coherent light beam at an angle corresponding to the pre-determined incidental angle of the coherent light beam onto the hologram for displaying the image on the screen;

and said personal identification card further comprises a grating bar code formed thereon, the grating bar code comprising at least one set of parallel and equally-spaced grating slits, extending along a first direction, with a pre-determined spacing distance between two adjacent ones of the slits, said slits forming a series of aligned light spots on the screen when the coherent light beam is projected thereon, the light spots having a spacing distance determined by the spacing distance of the slits, whereby the spacing distance of the slits encoding a symbol which is decodeable by the spacing distance of the light spots.

9. A personal identification card as claimed in claim 8, wherein the grating comprises interference pattern of coherent light beams formed on the hologram.

10. A personal identification card as claimed in claim 8, wherein the grating bar code further comprises a second set of parallel and equally-spaced grating slits, extending along a second direction substantially normal to the first direction.

11. A personal identification card as claimed in claim 8, wherein the grating bar code comprises more than two sets of parallel and equally-spaced grating, each set of grating extending along a direction not parallel with that of the other sets of the grating.

12. A holographic image identification system comprising:

image reconstruction means comprising a base on which a movable hologram holder is disposed to retain thereon a hologram on which an interference pattern representing a three-dimensional image of an object to be identified by said holographic image identification system is formed in advance and to move the hologram to an identification position;

coherent light beam generation means for selectively projecting, at a pre-determined incidental angle, a coherent light beam onto the hologram located on the identification position to display the three-dimensional image;

image reading means comprising a screen, on which the three-dimensional image is shown by the image reconstruction means, and a charge coupling device, which is connected to the screen to receive the three-dimensional image displayed on the screen and convert the image into electrical signal representing the image;

computer means having a storage memory, in which data of a reference image and a reference angle associated with the reference image are stored in advance, and a processing unit, which receives the electrical signal of the image to be identified from the image reading means, retrieves the reference image data and compares the image to be identified with the reference image, and when the comparison is successful, the processing unit further accesses the storage memory to retrieve the reference angle to compare with the pre-determined incidental angle at which the coherent light beam is projected onto the hologram wherein the coherent light beam generation means comprises a plurality of fixed coherent light sources, spaced along an arc path on the base with a center of the arc substantially coincidental with the hologram identification position to selectively project the coherent light beam at an angle corresponding to the pre-determined incidental angle of the coherent light beam onto the hologram for displaying the image on the screen.

13. A holographic image identification system as claimed in claim 12 wherein the image reading means further comprises focusing means disposed between the screen and the hologram.

14. A holographic image identification system as claimed in claim 13 wherein the focusing means comprises an optical system.

15. A holographic image identification system as claimed in claim 12 wherein the image to be identified comprises a matrix of pixels each having a gray level value associated therewith and being defined by coordinates associated with the pixel matrix; and wherein the electrical signal carries the gray level values of all the pixels together with coordinates thereof to the computer means; the reference image also comprising a matrix of pixels having coordinates corresponding to the coordinates of the pixel matrix of the image to be identified, and each of the pixels of the reference image having a gray level value associated therewith; and the comparison of the image to be identified with the reference image is done by comparing the gray level values of the corresponding pixels of the image to be identified and the reference image.

\* \* \* \* \*